United States Patent
Moe

(10) Patent No.: US 8,137,550 B1
(45) Date of Patent: *Mar. 20, 2012

(54) FLUID REMEDIATION SYSTEM FOR REMOVING PARTICULATES FROM AN AQUEOUS STREAM

(75) Inventor: Edward Beverly Moe, Willis, TX (US)

(73) Assignee: Tri-Flo International, Inc., Willis, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,892

(22) Filed: Nov. 19, 2010

Related U.S. Application Data

(60) Provisional application No. 61/285,698, filed on Dec. 11, 2009.

(51) Int. Cl.
- *B01D 21/01* (2006.01)
- *B01D 21/02* (2006.01)
- *B01D 21/26* (2006.01)
- *C02F 1/38* (2006.01)
- *C02F 1/52* (2006.01)

(52) U.S. Cl. ..... 210/202; 210/207; 210/241; 210/257.1; 210/259; 175/206

(58) Field of Classification Search .................. 210/702, 210/723, 724, 725, 729, 749, 788, 790, 806, 210/202, 207, 208, 209, 219, 241, 242.1, 210/252, 257.1, 259; 175/66, 206

See application file for complete search history.

(56) References Cited

U.S. PATENT DOCUMENTS

| | | | | |
|---|---|---|---|---|
| 4,459,207 A * | 7/1984 | Young | 175/206 |
| 4,474,254 A * | 10/1984 | Etter et al. | 175/206 |
| 4,931,190 A * | 6/1990 | Laros | 210/710 |
| 5,236,605 A * | 8/1993 | Warncke | 210/800 |
| 5,626,748 A * | 5/1997 | Rose | 210/241 |
| 5,853,583 A * | 12/1998 | Shah | 175/206 |
| 6,110,382 A * | 8/2000 | Wiemers et al. | 175/66 |
| 7,727,389 B1 * | 6/2010 | Mallonee et al. | 210/241 |
| 7,731,840 B1 * | 6/2010 | Mallonee et al. | 210/241 |
| 2005/0040119 A1 * | 2/2005 | Kulbeth | 210/806 |

* cited by examiner

*Primary Examiner* — Nam Nguyen
*Assistant Examiner* — Lucas Stelling
(74) *Attorney, Agent, or Firm* — Buskop Law Group, PC; Wendy Buskop

(57) ABSTRACT

A fluid remediation system for removing particulates from an aqueous stream having a separation component and a clarifier component is described herein. The separation component can include a frame, a scalping shaker for receiving a primary slurry and forming a first effluent, a mud cleaner for receiving the first effluent and forming a second effluent, a desilter for receiving the second effluent and forming a third effluent, a tank for containing the effluents, agitators in the tank, and pumps for pumping the effluents. The clarifier component can include a second frame and a second tank for receiving the third effluent from the separation component, which forms a sludge and a clean effluent. The system can include a controller for controlling the system.

18 Claims, 5 Drawing Sheets

FLUID REMEDIATION SYSTEM FOR REMOVING PARTICULATES FROM AN AQUEOUS STREAM

CROSS REFERENCE TO RELATED APPLICATIONS

The present application claims priority and the benefit of co-pending U.S. Provisional Application Ser. No. 61/285,698 filed on Dec. 11, 2009, entitled "FLUID REMEDIATION SYSTEM FOR REMOVING PARTICULATES FROM AN AQUEOUS STREAM". This reference is incorporated herein in its entirety.

FIELD

The present embodiments generally relate to a fluid remediation system for removing particulates from an aqueous stream.

BACKGROUND

A need exists for a containerizable modular system which can remove particulates, free oil, and other contaminates from an aqueous stream.

A further need exists for a rollable, trailerable system which can form a small footprint and can form portions of shipping containers for reduced cost during shipment.

The present embodiments meet these and other needs.

BRIEF DESCRIPTION OF THE DRAWINGS

The detailed description will be better understood in conjunction with the accompanying drawings as follows.

Figure 1:
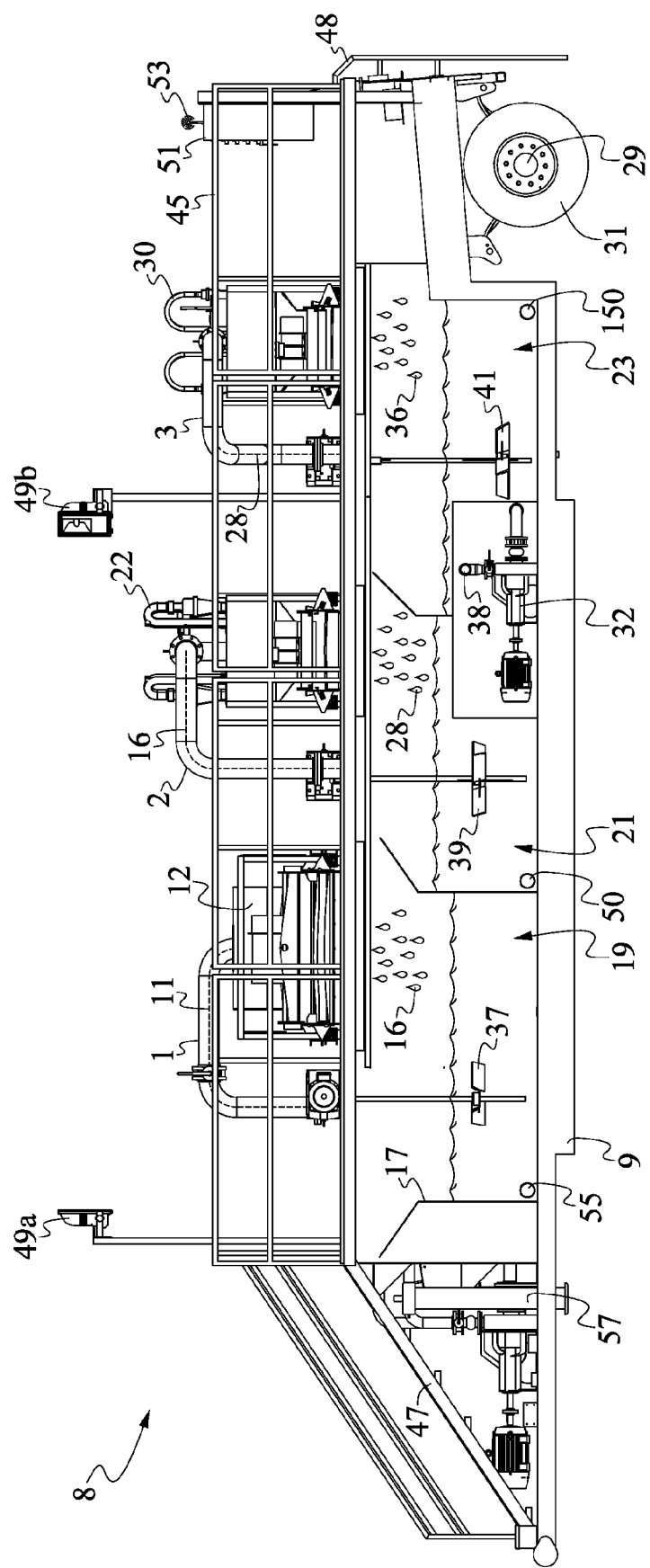
FIG. 1 is a side view of a separation component.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a fluid remediation system for removing particulates from an aqueous stream. Embodiments of the fluid remediation system can be portable, containerized, explosion resistant, or combinations thereof.

The fluid remediation system can be used to recycle a used primary slurry to improve rheology of a drilling fluid. Primary slurry can be a water based drilling fluid, such as a drilling fluid used in drilling an oil well.

Particulate that can be removed from the primary slurry can be drill cuttings, low gravity solids, or other particulates. For example, a first particulate that can be removed from the primary slurry can have a diameter of at least seventy microns.

The system can include a separation component. Embodiments of the separation component can be portable, containerized, explosion resistant, or combinations thereof.

The separation component can be disposed on a trailer which is also referred to herein as "a first frame". The first frame can be a moveable first frame.

The first frame can include at least one first axel for supporting a first wheel and a second wheel, allowing for ease of movement of the separation component.

The first frame can have at least one fixed walkway, a stairway, a handrail, illuminating lights, or combinations thereof disposed on or along a side of the first frame.

In embodiments, the illuminating lights can be 400 watt lights, telescoping lights, or combinations thereof.

The separation component can include a first scalping shaker disposed on the first frame for separating the first particulate from the primary slurry, which forms a first effluent. Examples of scalping shakers that can be used with the system include: a Triflo 148L Linear Shaker, a Triflo 148E, a Triflo 146E Elliptical Shaker, or a Triflo 126E; all of which are available from Tri-Flo International, Inc. of Willis, Tex.

The first particulate can be discharged from the first scalping shaker to a particulate moving means. The particulate moving means can be a screw conveyor. A particulate moving means trough can be disposed around the screw conveyor and can prevent particulate from falling on the ground. The particulate moving means trough can also catch overflowing effluent from any on-board tank or sections of a tank.

The separation component can have a first tank disposed on the first frame. The first tank can have a first section that can be in fluid communication with a second section of the first tank. The second section can be in fluid communication with a third section of the first tank. The first section, second section, and third section can each have an agitator for agitating any contents of therein.

The first section can be in fluid communication with the first scalping shaker and can receive the first effluent from the first scalping shaker. A first agitator disposed in the first section can agitate the first effluent, which can keep solids of the first effluent in suspension. Examples of agitators that can be used with the system include: a Triflo 500 Mud Agitator, a Triflo 750 Mud Agitator, or a Triflo 1000 Mud Agitator; all of which are available from Tri-Flo International, Inc. of Willis, Tex.

A first pump can be used to pump the first effluent from the first section of the first tank to a mud cleaner of the separation component. Examples of mud cleaners that can be used with the system include: a Triflo 16-4/146E, a Triflo 8-4/126E, or a Triflo 12-4/146E; all of which are available from Tri-Flo International, Inc. of Willis, Tex.

The mud cleaner can be in fluid communication with the first section and can receive the first effluent and remove mud, or a second particulate, from the first effluent, which can form a second effluent. The second particulate can be discharged to the particulate moving means. The second effluent can flow from the mud cleaner into the second section of the first tank. A second agitator disposed in the second section can agitate the second effluent, which can keep solids of the second effluent in suspension.

A second pump can be used to pump the second effluent from the second section to a desilter. The desilter can remove a third particulate from the second effluent, which can form a third effluent. The desilter can be in fluid communication with the second section. Examples of desilters that can be used with the system include: a Triflo 30-2/146E or a Triflo 20-2/126E; which are available from Tri-Flo International, Inc. of Willis, Tex.

The third effluent can flow from the desilter into the third section of the first tank. A third agitator disposed in the third section can agitate the third effluent, keeping solids of the third effluent in suspension.

The third particulate can be discharged to the particulate moving means.

In embodiments, the desilter can be an ultrafine desilter.

A third pump can be used to pump the third effluent to a discharge outlet. The discharge outlet can be in fluid communication with the third section.

In embodiments, the first pump, the second pump, and the third pump can each be a centrifugal pump or vertical direct pumps.

The pumps, the first scalping shaker, the mud cleaner, the desilter, the agitators, and the particulate moving means can all engage or be in communication with a controller.

The controller can provide power and control signals to the pumps, the first scalping shaker, the mud cleaner, the desilter, the agitators, and the particulate moving means.

The separation component with the first frame can be moved along a roadway without the need for special permits. The separation component can be a fully contained eight foot six inch wide standard sized system legally usable on roadways. In one or more embodiments, the system can be a smaller sized system.

The separation component can have a support grating disposed over at least one of the first section, the second section, or the third section.

Embodiments can include at least one clean out port disposed in at least one of the first section, the second section, or the third section.

In embodiments, a holding tank can be disposed on the first frame and can be in fluid communication with the first tank. The holding tank can receive effluent overflow from the first tank. A vertical mixer can be disposed in the holding tank. The vertical mixer can be used to keep solids of the effluent overflow in suspension or agitated.

A vertical pump can be disposed in the holding tank. The vertical pump can pump contents of the holding tank from the holding tank to the first section of the first tank.

The fluid remediation system can include a clarifier component. The clarifier component can be portable, explosion resistant, containerized, or combinations thereof.

The clarifier component can include a second frame, which can be a moveable second frame, such as a second trailer.

A second tank can be disposed on the second frame. The second tank can be a cone shaped tank. The third effluent can be allowed to decelerate in the second tank, which can form a sludge and a clean effluent. The clean effluent can be discharged from the second tank through an effluent discharge outlet. The sludge can be discharged through a sludge discharge outlet.

The clean effluent can be recycled back into an active drilling fluid or can be disposed of in an injection well.

In embodiments, the second tank can be in fluid communication with the first tank and can receive the third effluent from the discharge outlet of the separation component. A clean out port can be disposed in the second tank.

At least one axel with two wheels can be secured to the second frame, which can allow for ease of movement of the clarifier component. The clarifier component can also have a ladder disposed on the second frame.

In embodiments, the clarifier component can include a static mixer disposed on the second frame. During a shutdown of the clarifier component, the static mixer can be used to introduce a polymer from a polymer injector, through the static mixer, and into the second tank. The static mixer can facilitate blending of the polymer with any remaining third effluent within the second tank, such as for cleaning the second tank. This can form a clean aqueous stream and a sludge.

The clean aqueous stream can be discharged through the effluent discharge outlet and the sludge can be discharged from the second tank through a clean out port.

In embodiments, the polymer can be a polyacrylamide. In embodiments, a polymer make down injector system can be secured to the second frame.

The polymer make down injector system can blend the polymer with other components for introduction to the static mixer. The polymer make down injector system can use an injection pump to pressure feed the polymer into a polymer tank.

Embodiments can include a second injector in fluid communication with the second tank. The second injector can be used with the clarifier component to introduce bentonite, barite, or a pH modifier to the third effluent.

Embodiments of the clarifier component can have a capacity of about 6000 gallons.

One or more hydraulic lifts can be attached to the first frame, the second frame, or combinations thereof to enable a leveling of the frames.

An attachment, such as a hitch, can be provided on the frames to allow a tow vehicle to engage the frames securely for movement of the frames along a roadway.

Turning now to the Figures, FIG. 1 shows the separation component 8 having a moveable first frame 9.

On the moveable first frame 9 is a first scalping shaker 12 for separating a first particulate from the primary slurry 11. The primary slurry 11 can flow through a pipe or another flow line to the first scalping shaker 12. The primary slurry 11 is shown flowing to the first scalping shaker 12 through a first conduit 1.

A first tank 17 can be in fluid communication with the first scalping shaker 12. A first section 19 of the first tank 17 is shown receiving the first effluent 16 from the first scalping shaker 12.

The first effluent 16 is shown being pumped from the first section 19 through a second conduit 2 to a mud cleaner 22. The second conduit 2 can be in fluid communication with the first section 19 and the mud cleaner 22.

A second effluent 28 is shown flowing into a second section 21 of the first tank 17.

The second effluent 28 is also shown being pumped from the second section 21 to a desilter 30 through a third conduit 3. The third conduit can be in fluid communication with the second section 21 and the desilter 30.

A third effluent 36 is shown flowing from the desilter 30 to a third section 23 of the first tank 17.

A controller 51 can send power and control signals 53 to at least one of: a third pump 32, additional pumps used but not shown in this Figure, the desilter 30, the mud cleaner 22, an agitator 37 within the first section 19, an agitator 39 within the secon section 21, an agitator 41 within the third section 23, the first scalping shaker 12, a particulate moving means which is not shown in this Figure, and to other components of the separation component 8.

The third pump 32, the scalping shaker 12, the mud cleaner 22, the desilter 30, the agitators 37, 39, and 41, and the particulate moving means can each engage or otherwise be in communication with the controller 51.

The third pump 32 can pump the third effluent 36 from the third section 23 to a discharge outlet 38.

A first section clean out port 55 can be in fluid communication with the first section 19. A second section clean out port 50 can be in fluid communication with the second section 21. A third section clean out port 150 can be in fluid communication with the third section 23. Each respective clean out port can provide access to the first, second, and third sections of the first tank 17, allowing a user to clean or otherwise maintain the first tank 17.

The first section 19 can have the first agitator 37 therein. The second section 21 can have the second agitator 39 therein. The third section 23 can have the third agitator 41 therein.

The separation component 8 can have illuminating lights 49a and 49b, a stairway 47, a hydraulic lift system 57, a first axel 29, a first wheel 31, a handrail 45, and a ladder 48.

Figure 2:
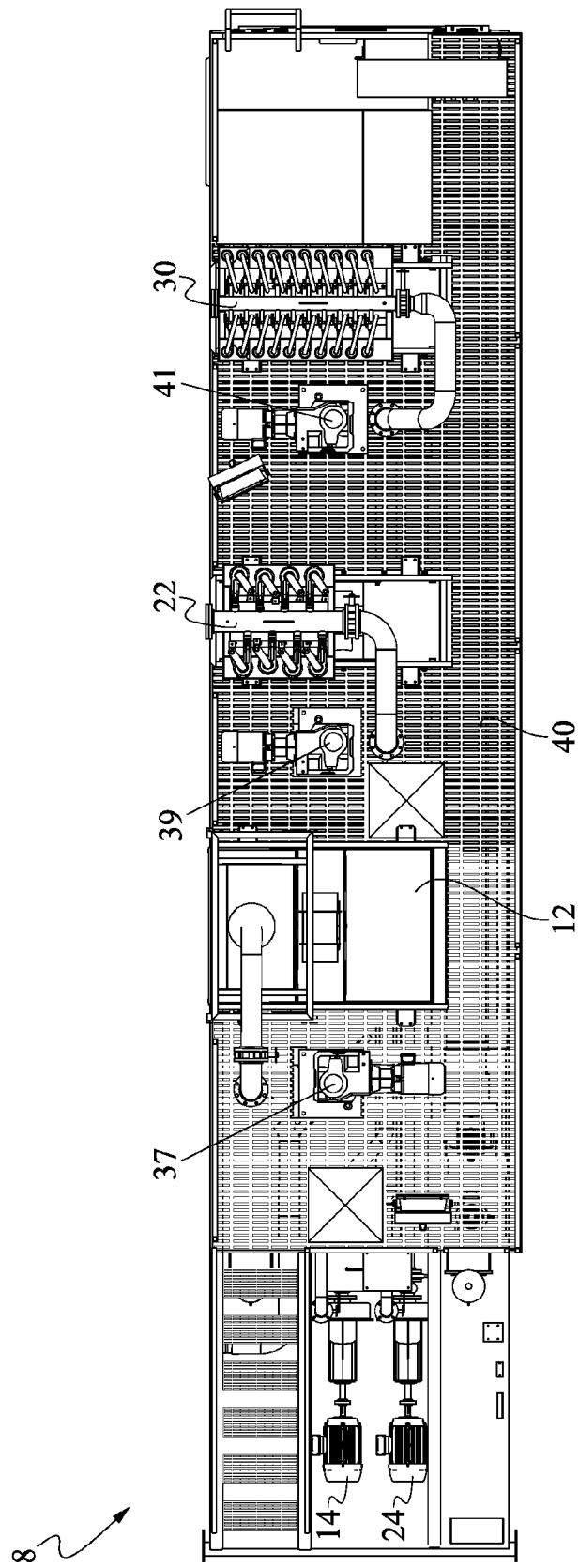
FIG. 2 is a top view of the separation component.

FIG. 2 is a top view of the separation component 8. The separation component 8 is shown with the desilter 30, the mud cleaner 22, the first scalping shaker 12, the first agitator 37, the second agitator 39, and the third agitator 41.

A first pump 14 is shown for pumping the first effluent from the first section to the mud cleaner 22. A second pump 24 is shown for pumping the second effluent from the second section to the desilter 30. Also shown is a support grating 40.

Figure 3:
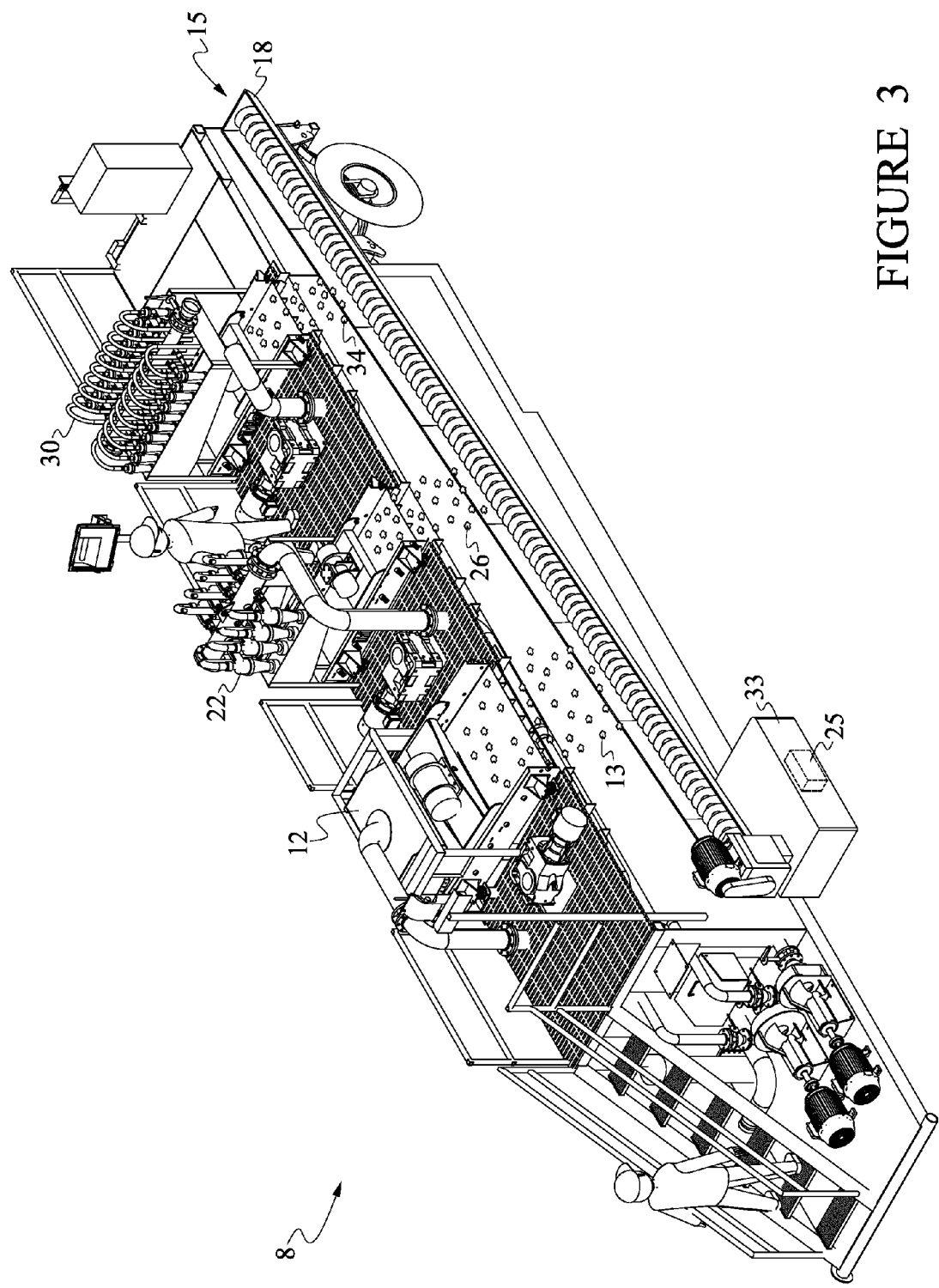
FIG. 3 is an isometric view of the separation component.

FIG. 3 is a perspective view of the separation component 8.

A particulate moving means 15 with a particulate moving means trough 18 can receive effluent when effluent overflows from at least one of the sections of the first tank. The particulate moving means 15 can be an auger, as depicted, or a similar device.

A first particulate 13 is shown being discharged from the first scalping shaker 12 into the particulate moving means trough 18 of the particulate moving means 15.

A second particulate 26 is shown being discharged from the mud cleaner 22 into the particulate moving means trough 18.

A third particulate 34 is shown being discharged from the desilter 30 into the particulate moving means trough 18.

Also shown is the holding tank 33 and a vertical pump 25.

Figure 4:
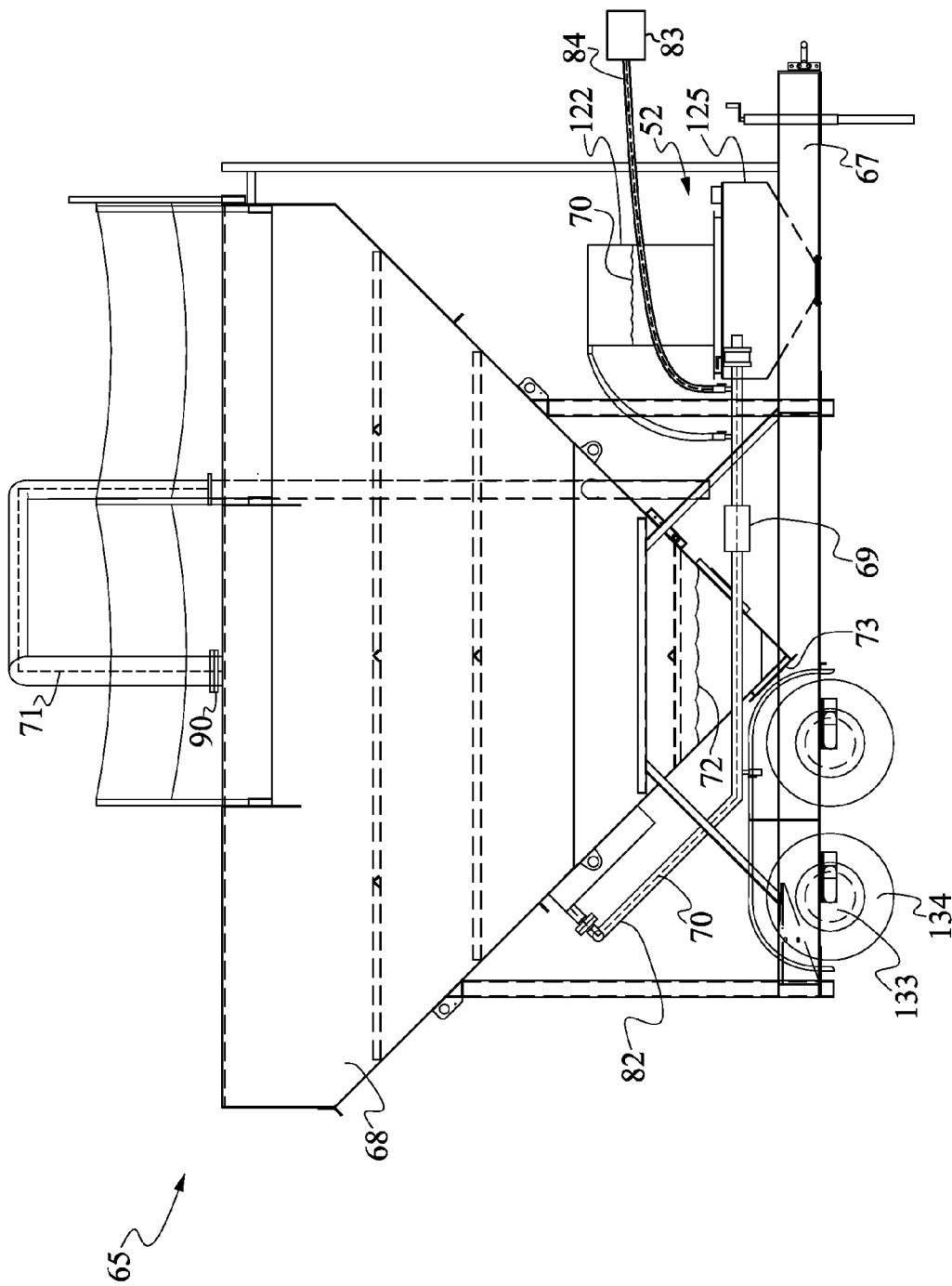
FIG. 4 is a side view of a clarifier component.

FIG. 4 is a side view of a clarifier component 65. The clarifier component 65 can be in fluid communication with the separation component.

The clarifier component 65 can include a moveable second frame 67, a clarifier axel 133, and a clarifier wheel 134.

A second tank 68 can be disposed on the moveable second frame 67, which can receive the third effluent from the discharge outlet of the separation component.

The clarifier component 65 is also shown having a polymer make down injector system 52 for injecting a polymer 70 into the second tank 68. An injection pump 125 and a polymer injector 82 can be used to flow the polymer 70 from a polymer tank 122 to the second tank 68. The polymer make down injector system 52 can blend the polymer 70 with other components for introduction to a static mixer 69, after which the blended polymer 70 and components can be introduced to the second tank 68.

The static mixer 69 can facilitate blending of the third effluent with the polymer 70, forming a clean aqueous stream 71 and a sludge 72. The sludge 72 can be discharged from a clean out port 73 and can be subsequently dried. The clean aqueous stream 71 is shown flowing from an effluent discharge outlet 90.

A second injector 83 is shown in fluid communication with the second tank 68 for introducing a second component 84 into the second tank 68, which can be blended with the polymer 70. The second component 84 can be bentonite, barite, or a pH modifier.

Figure 5:
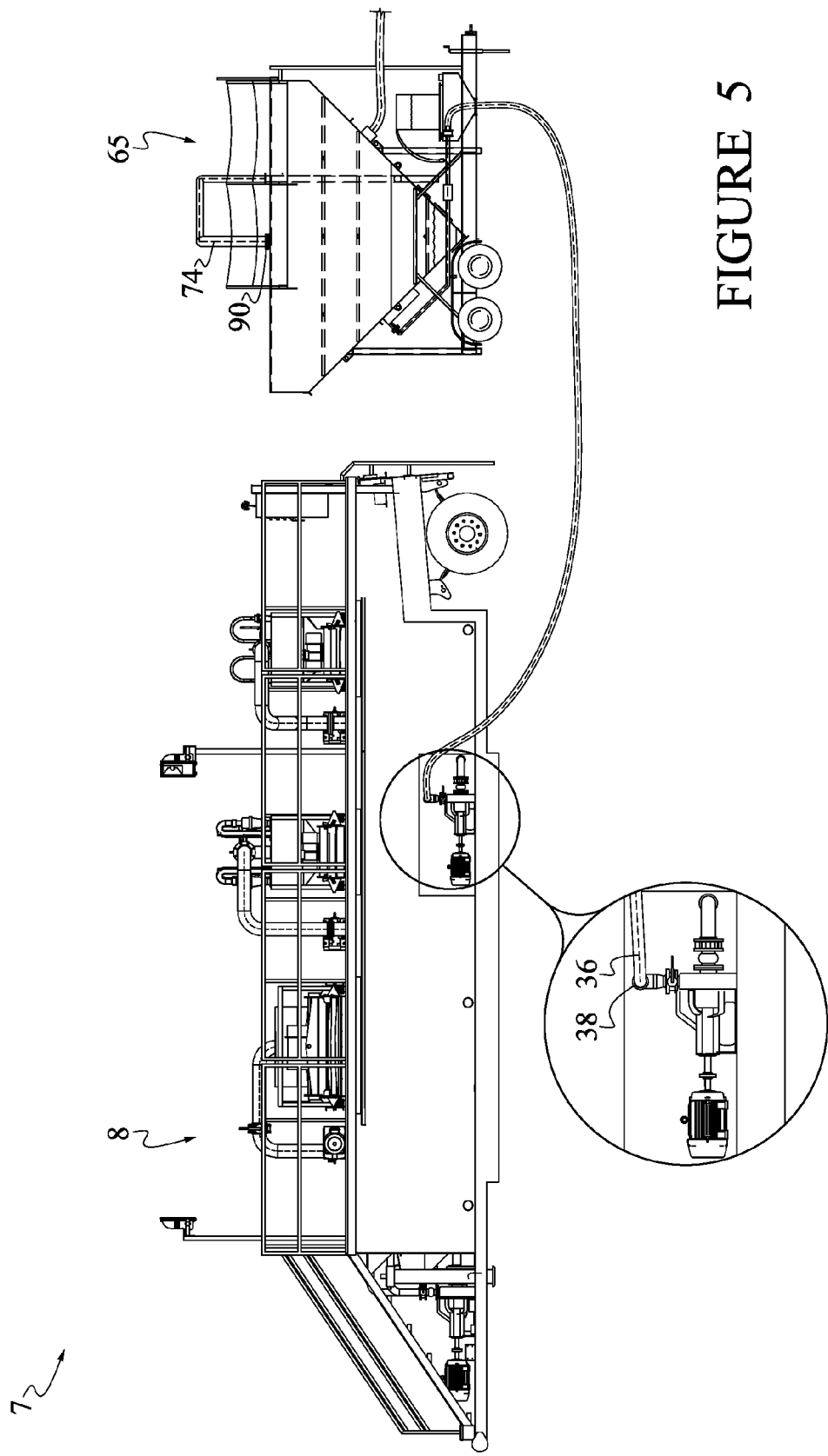
FIG. 5 is a view of the separation component and the clarifier component.

FIG. 5 shows an embodiment of the fluid remediation system 7. The clarifier component 65 is shown in fluid communication with the discharge outlet 38 of the separation component 8, and is shown receiving the third effluent 36 from the discharge outlet 38. A clean effluent 74 is show flowing from the clarifier component 65 through the effluent discharge outlet 90.

While these embodiments have been described with emphasis on the embodiments, it should be understood that within the scope of the appended claims, the embodiments might be practiced other than as specifically described herein.

What is claimed is:

1. A fluid remediation system for removing particulates from an aqueous stream, the system comprising:
   (a) a separation component comprising:
      (i) a first frame;
      (ii) a first scalping shaker disposed on the first frame for receiving a primary slurry and for separating a first particulate and a first effluent from the primary slurry, wherein the first particulate is discharged to a particulate moving means disposed on the first frame, and wherein the particulate moving means is a screw conveyor;
      (iii) a first tank on the first frame having a first section, a second section, and a third section, wherein the first section is in fluid communication with the first scalping shaker for receiving first effluent from the first scalping shaker, wherein the screw conveyor comprises a particulate moving means trough for receiving effluent overflow when effluent overflows from at least one of the sections of the first tank, and wherein the particulate moving means trough transfers the effluent overflow to a holding tank for recycling the effluent overflow to the first section;
      (iv) a first agitator disposed in the first section, a second agitator disposed in the second section, and a third agitator disposed in the third section;
      (v) a mud cleaner disposed on the first frame;
      (vi) a first pump disposed on the first frame for pumping the first effluent from the first section to the mud cleaner, wherein the mud cleaner cleans the first effluent forming a second particulate and a second effluent, wherein the second particulate is discharged to the particulate moving means, and wherein the second effluent flows into the second section;
      (vii) a desilter disposed on the first frame;
      (viii) a second pump disposed on the first frame for pumping the second effluent from the second section to the desilter, wherein the desilter desilts the second effluent forming a third particulate and a third effluent, wherein the third particulate is discharged to the particulate moving means, and wherein the third effluent flows into the third section;
      (ix) a third pump disposed on the first frame for pumping the third effluent to a discharge outlet; and
      (x) a controller in communication with at least one of: the first pump, the second pump, the third pump, the first scalping shaker, the mud cleaner, the desilter, the first agitator, the second agitator, the third agitator, or the particulate moving means, wherein the controller provides power and control signals; and
   (b) a clarifier component comprising:
      (xi) a second frame; and
      (xii) a second tank disposed on the second frame and in fluid communication with the discharge outlet, wherein the second tank receives the third effluent from the discharge outlet, and wherein the third effluent decelerates in the second tank to form a sludge and a clean effluent.

2. The system of claim 1, further comprising an effluent discharge outlet on the second tank, wherein the clean effluent flows from the second tank through the effluent discharge outlet.

3. The system of claim 1, further comprising a polymer make down injector system disposed on the second frame, wherein the polymer make down injector system introduces a polymer to the third effluent.

4. The system of claim 3, wherein the polymer make down injector system comprises:
   (a) a polymer tank containing the polymer;
   (b) a polymer injector in fluid communication with the second tank and the polymer tank, wherein the polymer injector introduces the polymer into the second tank;
   (c) an injection pump in fluid communication with the polymer tank, wherein the injection pump pressure feeds the polymer into the second tank; and
   (d) a static mixer in fluid communication with the injection pump, wherein the static mixer blends the polymer with other components before introducing the polymer to the second tank, and wherein a clean aqueous stream and a sludge are formed as the polymer is introduced into the second tank.

5. The system of claim 1, further comprising an injector disposed on the second tank, wherein the injector introduces to the third effluent a member of the group consisting of: bentonite, barite, and a pH modifier.

6. The system claim 1, further comprising a vertical pump disposed in the holding tank for pumping the effluent overflow from the holding tank to the first section.

7. The system of claim 1, further comprising a support grating disposed over at least one of the sections of the first tank.

8. The system of claim 1, further comprising a first axel disposed on the first frame, wherein the first axel supports a first wheel and a second wheel.

9. The system of claim 1, further comprising a clarifier axel disposed on the second frame, wherein the clarifier axel supports a first clarifier wheel and a second clarifier wheel.

10. The system of claim 1, further comprising a handrail, a stairway, an illuminating light, a ladder, or combinations thereof disposed on the first frame.

11. The system of claim 1, further comprising a clean out port disposed on at least one member of the group consisting of: the first section, the second section, the third section, and the second tank.

12. The system of claim 1, further comprising a hydraulic lift system disposed on the first frame.

13. The system of claim 1, further comprising an attachment means disposed on the first frame, the second frame, or combinations thereof to enable a tow vehicle to engage at least one of the frames for movement along a roadway.

14. The system of claim 1, wherein the primary slurry is a drilling fluid.

15. The system of claim 14, wherein the first particulate, the second particulate, and the third particulate are each a member of the group consisting of: drill cuttings, low gravity solids, and other particulates.

16. A fluid remediation system for removing particulates from an aqueous stream, the system comprising:
(a) a separation component comprising:
  (i) a first frame;
  (ii) a first scalping shaker disposed on the first frame, wherein the first scalping shaker receives a primary slurry and separates a first particulate from the primary slurry to form a first effluent, wherein the first particulate is discharged to a particulate moving means disposed on the first frame, and wherein the particulate moving means is a screw conveyor;
  (iii) a first section of a first tank in fluid communication with the first scalping shaker for receiving the first effluent, wherein the screw conveyor comprises a particulate moving means trough for receiving effluent overflow when effluent overflows from the first section of the first tank, and wherein the particulate moving means trough transfers the effluent overflow to a holding tank for recycling the effluent overflow to the first section;
  (iv) a mud cleaner disposed on the first frame and in fluid communication with the first section for receiving the first effluent, wherein the mud cleaner cleans a second particulate from the first effluent to form a second effluent, and wherein the second effluent flows from the mud cleaner into a second section of the first tank;
  (v) a desilter disposed on the first frame and in fluid communication with the second section, wherein the desilter receives the second effluent from the second section, wherein the desilter removes a third particulate from the second effluent to form a third effluent, and wherein the third effluent flows from the desilter into a third section of the first tank; and
  (vi) a discharge outlet in fluid communication with the third section.

17. The system of claim 16, further comprising a clarifier component in fluid communication with the separation component, wherein the clarifier component comprises:
  (i) a second frame;
  (ii) a second tank disposed on the second frame and in fluid communication with the discharge outlet, wherein the second tank receives the third effluent from the discharge outlet, and wherein the third effluent decelerates in the second tank to form a sludge and a clean effluent; and
  (iii) an effluent discharge outlet, wherein the clean effluent flows from the second tank through the effluent discharge outlet.

18. A fluid remediation system for removing particulates from an aqueous stream, the system comprising:
(a) a separation component comprising:
  (i) a first frame;
  (ii) a first scalping shaker disposed on the first frame for receiving a primary slurry and for separating a first particulate from the primary slurry, forming a first effluent, wherein the first particulate is discharged to a particulate moving means disposed on the first frame, and wherein the particulate moving means is a screw conveyor;
  (iii) a first section in fluid communication with the first scalping shaker for receiving the first effluent, wherein the screw conveyor comprises a particulate moving means trough for receiving effluent overflow when effluent overflows from the first section, and wherein the particulate moving means trough transfers the effluent overflow to a holding tank for recycling the effluent overflow to the first section;
  (iv) a mud cleaner disposed on the first frame in fluid communication with the first section for receiving the first effluent from the first section, wherein the mud cleaner cleans a second particulate from the first effluent forming a second effluent, and wherein the second effluent flows into a second section;
  (v) a desilter disposed on the first frame in fluid communication with the second section, wherein the desilter receives the second effluent from the second section, wherein the desilter removes a third particulate from the second effluent forming a third effluent, and wherein the third effluent flows into a third section; and
  (vi) a discharge outlet disposed on the first frame in fluid communication with the third section, wherein the discharge outlet discharges the third effluent from the third section; and
(b) a clarifier component comprising:
  (vii) a second frame;
  (viii) a second tank disposed on the second frame and in fluid communication with the discharge outlet, wherein the second tank receives the third effluent from the discharge outlet, and wherein the third effluent decelerates in the second tank to form a sludge and a clean effluent; and
  (ix) an effluent discharge outlet, wherein the clean effluent flows from the second tank through the effluent discharge outlet.

* * * * *